Figures 1, 2, 3:
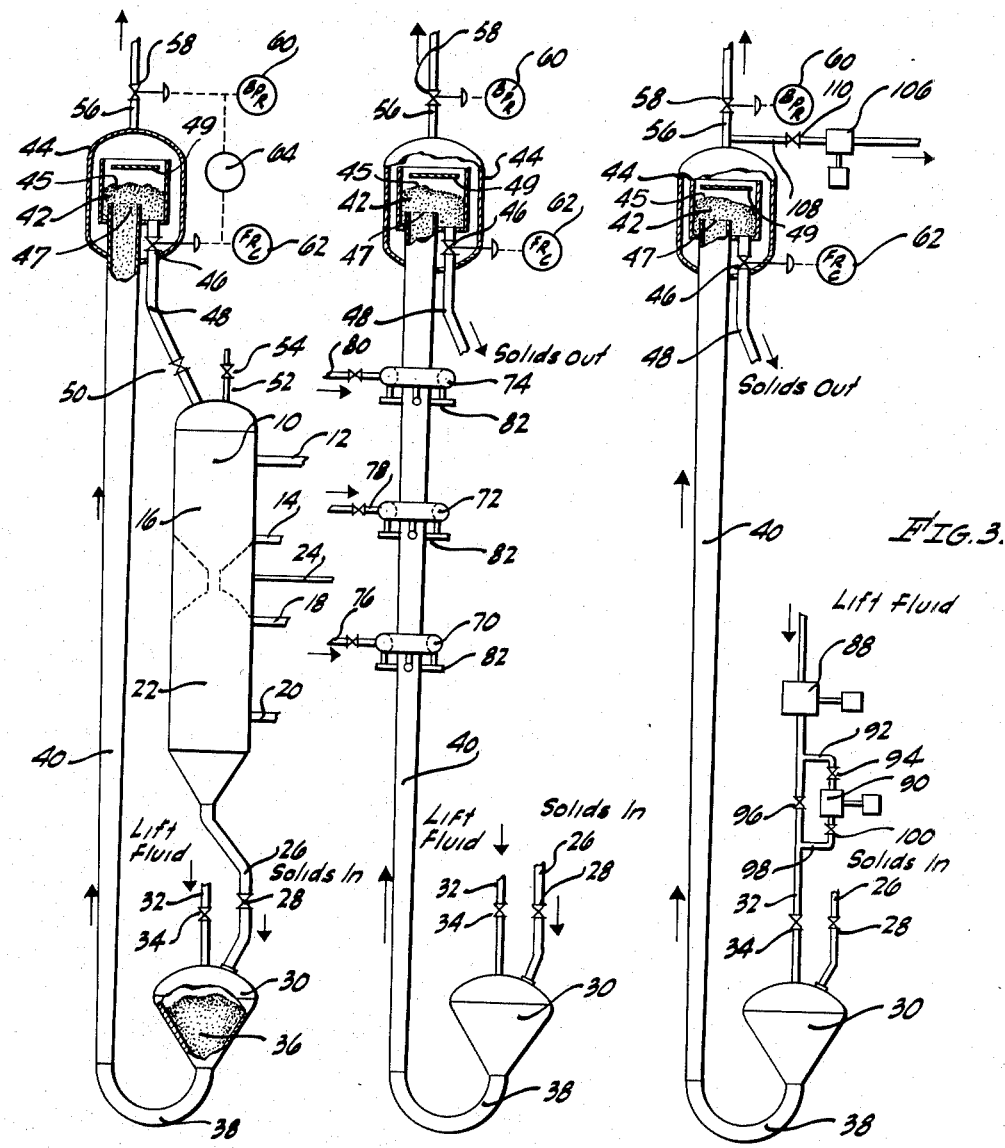

INVENTOR.
JOHN E. HINES, JR.,
BY
AGENT.

INVENTOR.
JOHN E. HINES, JR.,
BY
AGENT.

United States Patent Office 2,724,617
Patented Nov. 22, 1955

2,724,617

START-UP METHOD AND APPARATUS FOR GRANULAR SOLIDS CONVEYANCES

John E. Hines, Jr., Long Beach, Calif., assignor to Union Oil Company of California, Los Angeles, Calif., a corporation of California Application October 26, 1950, Serial No. 192,195

19 Claims. (Cl. 302—17)

This invention relates to the conveyance of granular solids as substantially compact continuous masses through conduits by means of a conveyance fluid concurrently depressuring therethrough and in particular relates to methods and improved apparatuses for initiating solids conveyance in such systems.

In many industries the conveyance of granular solids in substantial quantities is involved. Some of the best known examples of such solids conveyance operations are the ore-treating industries such as the reduction of aluminum oxide to produce aluminum, the roasting of pulverized sulfide ores in multiple furnaces, and many others. In the movement and storage of cereal grains large quantities of granular solids are transported over considerable distances from and into various storage bins. In adsorption operations including clay treating of lubricating oil, bone char clarification of sugar solutions, the deionization of aqueous fluids with granular ion exchange resins, other static and moving bed adsorption processes in which gaseous mixtures are contacted with the adsorbent and separated and in the numerous catalytic conversion processes, a plurality of treating vessels is employed to which granular solids must be supplied and from which they must be removed. In all of these solids-fluid contact operations a fluid to be treated is passed in contact with the granular solids which at the time may be in motion or stationary and in which the conveyance of granular solids is of prime importance to satisfactory performance.

In all of the many operations exemplified above losses or misdistribution of the granular solids are undesirable and abrasion of mechanical equipment and attrition of the solids are to be avoided.

Conventionally such granular solids are conveyed by means of bucket elevators, closed or open drag lines, suspension gas lifts, and belt conveyors. Such pieces of equipment may be employed to distribute granular solids from the source to the desired delivery point or points or to circulate granular solids through a given system of treating zones.

The foregoing types of equipment have certain well known disadvantages which render them undesirable for many purposes. Bucket elevators, drag lines, belt and other mechanical conveyors all involve moving parts which wear excessively in contact with the granular solids, which must be lubricated, which are usually not operable under elevated pressures and which are difficult to maintain at elevated temperatures. In conventional suspension gas lift processes, large quantities of conveyance fluid per unit weight of granular solids conveyed are ordinarily required for operation and as the granular solids particles are free to move with respect to one another during conveyance and do so move at substantial velocities the granular solids attrition rate is often higher than tolerable.

The process and apparatus of the present invention overcome these disadvantages and provide a conveyor for the movement of granular solids in the manner described which is readily operable under pressure and at elevated temperatures, which is devoid of moving mechanical parts, which is capable of transferring unusually large quantities of granular solids for a given power consumption and which does not cause deterioration of the granular solids by attrition or of the conveyance equipment due to abrasion.

The difficulties and disadvantages are overcome in the conveyor system in the present invention by providing a conduit of special design through which the solids are conveyed under the influence of a concurrently depressuring conveyance fluid and in which the granular solids during conveyance are maintained as a substantially compact continuous porous mass as hereinafter defined which moves as a porous plug through the conduit.

The conveyance force required to convey the granular solids in the form described is derived from the resultant forces on the porous mass of granular solids by a conveyance fluid depressuring therethrough. The conveyance force is directly proportional to the pressure gradients with respect to the length of the conveyance conduit. In conveyance conduits which rise either vertically or at any inclination with respect to the horizontal, the conveying force acts against gravity and a conveyance force sufficient to overcome gravitational forces as well as frictional forces is required. The conveyance force ratio given as $$\frac{\left(\dfrac{dp}{dl}\right)}{\rho_s \cos \theta}$$

(wherein $$\left(\frac{dp}{dl}\right)$$

is the lineal pressure gradient in pounds per square foot per foot, $\rho_s$ is the vibrational bulk density of granular solids being conveyed in pounds per cubic foot and $\theta$ is the angle of inclination of the conveyance zone with respect to the vertical) is a measure of the conveyance force at any point in the conveyance conduit. For solids motion in the conduit the pressure gradient must be such that the conveyance force ratio as a value exceeding 1.0, a value of between about 1.01 and about 1.5 being the usual values.

The highest efficiency of solids conveyance is realized when the conveyance force ratio is constant throughout the entire length of the conveyance zone which permits a minimum inlet conveyance fluid pressure to be employed for conveying the solids. Under such conditions the minimum energy per pound of solids conveyed is realized and the least compressor pump horse power is required.

During operation, conveyance fluid introduced into the conveyance conduit may be considered to be in two parts, the first portion being contained in the void spaces of the granular masses introduced into the conveyance conduit and a second portion which may be considered as depressuring through the void spaces to generate the conveyance force. As the conveyance fluid depressures through the conveyance conduit the pressure at any point decreases, the specific volume of the conveyance fluid increases and a part of the conveyance fluid introduced in the voids expands and contributes itself to the second portion of conveyance fluid. Therefore, in the portions of the conveyance conduit at successively greater distances from the solids inlet, the conveyance force ratio tends to increase to values greater than the minimum for conveyance. To compensate for this occurrence and to maintain a minimum conveyance force ratio throughout the line, the cross sectional area of the conveyance conduit is increased with the distance from the inlet in order to maintain a substantially constant conveyance fluid velocity and conveyance force at all points in the conveyance conduit. In order to do this the conveyance conduit is fabricated from a series of interconnected cylindrical sections of increasing diameter in the direction of solids flow or from a tapered conduit in which the cross sectional area is gradually increased in the direction of solids flow.

In the conveyance process of the present invention liquid or gaseous conveyance fluids may be employed. Since the coefficient of expansion of gases is considerably greater than with liquids, the required variation in cross sectional area of the conveyance conduit required to maintain a constant conveyance force is considerably greater with gases than with liquids. In most cases a cylindrical line is satisfactory when liquid conveyance fluids are employed and in cases where gases are used and the pressure differential across the conduit is less than about 5% of the absolute pressure of the conduit inlet.

In a conveyance conduit designed as above described for a minimum consumption of energy per unit weight of solids transported it has been found that particular procedures for initiating granular solids flow are required. In such a conveyance conduit full of granular solids it has been found that establishing a conveyance conduit inlet pressure by introducing conveyance fluid thereinto which is the minimum design pressure of operation, is sufficient to maintain solids flow but insufficient to initiate motion of the solids through the conduit. It has been found that the granular solids fail to move because of the fact that only the second portion of conveyance fluid is passing through the regions of the conveyance conduit farther from the solids inlet and that the first portion, that part introduced within the voids of the compact granular solids entering the conduit during operation, is not carried into the line until solids motion begins. Although the inlet pressure is the same as the design operating pressure and the conveyance force ratio at the solids inlet is in excess of 1.0, the quantity of conveyance fluid flowing in the farther portions of the line is considerably less than the quantity flowing therein when the granular solids are moving and the conveyance force ratio in these farther portions decreases in the direction of potential solids flow and is below 1.0 so that no solids move. The portion of the conveyance zone in which the force ratio is less than 1.0 before solids motion begins is herein the "deficiency portion" and it is in this portion of the conveyance zone or conduit that the conveyance forces must be supplemented to initiate solids movement.

It is therefore an object of the present invention to provide improved procedures and modified apparatus for initiating compact granular solids flow in the particular conveyance apparatuses described herein.

It is a more particular object of this invention to provide a start-up procedure for compact granular solids conveyances in which the conveyance fluid flowing in the farther or deficiency portions of the conduit from the solids inlet is supplemented for a sufficient time to initiate solids motion and is then discontinued.

It is another object of this invention to establish conveyance force ratios in the deficiency parts of the conveyance conduit approaching the discharge point, which ratios are above the minimum required for granular solids flow in order to initiate solids motion.

Another object of this invention is to provide an improved conveyance apparatus adapted to achieve the foregoing objects.

Other objects and advantages of the present invention will become apparent to those skilled in the art as the description thereof proceeds.

Briefly the present invention comprises a process and modified apparatus for initiating solids flow in an enclosed conveyance conduit wherein granular solids are conveyed during operation in substantially compact form under the influence of a concurrently depressuring conveyance fluid and in which a substantially constant conveyance force is maintained throughout the length of the conveyance apparatus. The conveyance forces exerted by the conveyance fluid flow existing during start-up operations in the deficiency portions of the conduit farther from the solids inlet are supplemented in one of several ways including: first, preliminarily pressuring the entire conveyance conduit to a pressure above the design outlet pressure followed by a controlled depressuring of the line back to the design outlet pressure; second, injecting additional conveyance fluid into the conveyance conduit at a plurality of points along that part of the conveyance conduit nearest the discharge opening; third, raising the conveyance fluid inlet pressure to the conveyance conduit to a value substanitally increased above the design inlet value; and fourth, depressuring the conveyance conduit outlet to a value below the design outlet pressure.

In each of the foregoing methods the net effect is to supplement the velocity and the conveyance force of the conveyance fluid in the deficiency portions of the conduit approaching the discharge outlet whereby granular solids motion may be initiated and maintained by the design conveyance fluid flow after the supplementary forces are discontinued.

In the present specification the term "substantially compact form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64% [1]) and the greatest bulk density (about 41.5% greater) when uniformly packed with particle centers coinciding with the apexes of a tetrahedron (rhombohedral packing—pore volume 25.95% [1]). The bulk density of solids during conveyance according to this invention is intermediate between the bulk densities of solids uniformly packed according to the foregoing systems and is apparently a random mixture of several packing geometries. Similar density variations occur in packings of nonuniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density

[1] Micromeritics, J. M. Dalla Valle (1943), p. 105.

variation the following data are given typical of an operation for conveying compact solids:

| | |
|---|---|
| Conduit height, feet | 27.25 |
| Conduit attitude | Vertical |
| Conduit diameter, inches: | |
| Inlet | 3.068 |
| Outlet | 4.000 |
| Conveyance fluid | Air |
| Solids mesh size | 4–10 |
| Solids flow rate, lb./hr | 4,500 |
| Solids vibrational bulk density lb./cu. ft | 46.7 |

Upon depressuring the conveyance fluid from the bottom of the conduit while preventing further introduction of solids thereinto, it was noted that the solids level dropped only 0.25 feet from the solids outlet at the top of the 27.25 foot line indicating an operating solids bulk density of 46.3 pounds per cubic foot during conveyance. This is approximately an 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient or as a check determination the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140 foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly in aerated or so-called "fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\left(\frac{dp}{dl}\right)}{\rho_s \cos \theta}$$

(the terms of which are given elsewhere herein). Except in relatively rare cases when the operating bulk density is decreased by an amount approaching 20% of the vibrational bulk density $\rho_s$ due to packing rearrangements of the compact solids and the ratio thus determined may be as low as 0.8, the conveyance force ratio as thus calculated exceeds 1.0 for conveyance of substantially compact solids whereas in a conduit carrying an aerated suspension a very considerably lower value of $$\left(\frac{dp}{dl}\right)$$

and a conveyance force ratio well below 1.0 based on the vibrational bulk density is found. Both compact and aerated solids may exist in the same conduit and is a desirable operation in such processes as contact coking wherein the solids increase the size during operation. The increased solids attrition due to the aeration reduces this particle size and may be controlled to balance one effect against the other. In most other cases it is desirable to maintain the entire mass of solids in compact form for minimum energy requirements and solids attrition rate.

Thus in the present invention, the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and are not free to move relative to them differentiating those conveyance operations in which the solids are aerated, fluidized or otherwise suspended in a fluid and have operating bulk densities always considerably less than 80% of the vibrational or static bulk density.

The start-up processes and modified conveyance apparatuses will be more clearly understood from the following discussion in conjunction with the accompanying drawings in which:

Figure 1 shows an elevation view in partial cross section of the conveyance conduit of the present invention in which start-up means are provided for pressuring and subsequently depressuring the conveyance conduit outlet to and from respectively, a pressure in excess of the design outlet pressure, Figure 2 shows an elevation view in partial cross section of the conveyance conduit in which supplementary conveyance fluid is directly injected along the length thereof, Figure 3 shows an elevation view in partial cross section of another modification of the conveyance conduit in which either the discharge outlet is depressured to a pressure below the design value or the inlet pressure is raised to a value in excess of the design value to initiate solids flow, Figures 4 and 5 graphically indicate the changes in conveyance fluid pressure and conveyance force ratio during the start-up operation described in connection with Figure 1, Figures 6 and 7 graphically indicate the variation in pressure and conveyance force ratio in the modification shown and described in connection with Figure 2, and Figures 8 through 11 graphically illustrate the variation in pressure in conveyance force ratio during the start-up procedures described in connection with Figure 3.

Referring now more particularly to Figure 1, contacting vessel 10 is shown through which the conveyance apparatus according to the present invention is employed to circulate granular solids such as catalyst, adsorbent, granular heat transfer material, and the like. Inlets and outlets 12 and 14 are provided in zone 16 of column 10, inlets and outlets 18 and 20 are provided for zone 22 in the lower part of column 10. Conduit 24 is provided for the passage of a seal gas into or out of a point intermediate between zones 16 and 22.

In Figures 1, 2 and 3 granular solids pass via transfer line 26 controlled by valve 28 into induction zone 30. A conveyance fluid under pressure is introduced via line 32 controlled by valve 34 into the induction chamber 30. An accumulation 36 of granular solids to be conveyed is formed in induction chamber 30 in substantially compact form. Under the influence of conveyance fluid depressuring concurrently therewith, granular solids pass in substantially compact form through a redirection zone 38 and through conveyance zone 40 into expansion zone 42 contained within separator chamber 44 forming therein a dead bed of compact unfluidized solids 45 submerging and restricting solids discharge flow from outlet opening 47 of conveyance zone 40 thereby maintaining the solids flowing therethrough in compact and unfluidized form. A baffle plate 49 is provided above the dead bed of solids to prevent loss thereof during upset operating conditions. The expansion zone is described in more detail and claimed specifically in co-pending application Serial No. 149,323. The flow rate of granular solids through the conveyance zone is determined by the rate at which granular solids are withdrawn from expansion zone 42. This in turn is controlled by the adjustment of valve 46 in transfer line 48 which delivers granular solids from the separator zone to the upper portion of contacting column 10 or other delivery point. In Figure 1 block valve 50 is provided for isolating chamber 44 from vessel 10 and outlet line 52 controlled by valve 54 is provided either for removing a seal gas from vessel 10 or introducing a seal gas thereinto.

In separator chamber 44 conveyance fluid is separated from conveyed solids and removed therefrom via line 56 at a rate controlled by valve 58 which may be actuated by back pressure regulator 60. Solids flow control valve 46 is conveniently controlled by flow recorder controller 62.

The foregoing description applies to the general operating conditions maintained in all three modifications of apparatus shown in Figures 1, 2 and 3.

Figure 4:
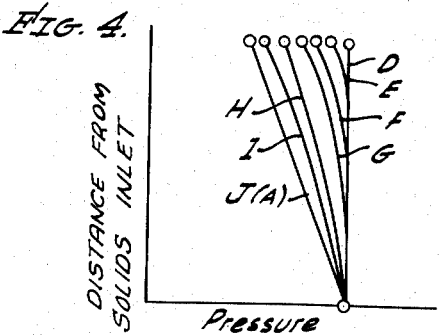
Figure 5:
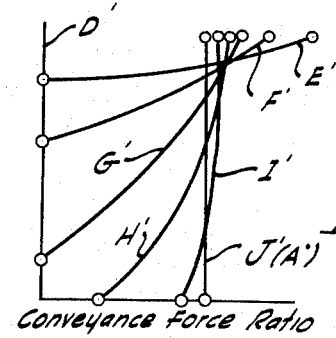

Referring now more particularly to Figure 1 and Figures 4 and 5, a modification of the start-up process of the present invention is subsequently described in which the conveyance fluid outlet from separator chamber 44 is restricted causing the outlet pressure to rise and approach or equal the inlet pressure, thus increasing the quantity of conveyance fluid contained in the voids of the granular mass of solids. Upon subsequently opening valve 58 and depressuring separator chamber 44 and the upper portions of conveyance zone 40 the conveyance fluid velocity and the conveyance forces in the upper part of the conveyance zone are supplemented whereby granular solids flow is initiated. As described above, upon the introduction of granular solids into the inlet end of the conveyance zone the deficiency of conveyance fluid in those portions of the conveyance zone nearest the discharge opening is alleviated and the design operating inlet pressure is sufficient to maintain solids motion. Preferably during the start-up procedure instrument 64 acts to open valve 58 at a predetermined rate once the conveyance zone is pressured to a value greater than its design outlet pressure and simultaneously opens solids flow control valve 46 to allow granular solids to discharge from expansion zone 42. At the same time induction zone 36 is maintained at the design inlet pressure and operation begins.

Referring now more particularly to Figures 4 and 5 which will be described together, the variation of pressure in the conduit with respect to the distance from the solids inlet during the start-up operation is shown in Figure 4 and the variation in the conveyance force ratio with time and the distance from the solids inlet is shown in Figure 5. Curves A and A′ represent the optimum design conditions of pressure and conveyance force, respectively. In Figure 4 it is seen that the pressure decreases linearly with distance from the solids inlet and in Figure 5 the conveyance force ratio is constant throughout the length of the line. In the instance shown graphically in these figures the entire conveyance zone is pressured to the design inlet operating pressure at which point the pressure along the line is represented by curve D and since no conveyance fluid flow exists after equilibrium conditions are established the conveyance force is zero as shown by curve D′. Through the operation of instrument 64 which depressures separator chamber 44 from the design inlet pressure to the design outlet pressure a transient depressuring wave front moves down the conveyance zone successively establishing the pressure gradient curves E, F, G, H, I and J shown in Figure 4. It is seen that curve J corresponds with the design pressure curve A. At the same time as this depressuring occurs, a variation in conveyance force at various points in the conveyance zone occurs which is shown in Figure 5. Therein curves E′, F′, G′, H′, I′ and J′ correspond to the similarly lettered curves of Figure 4. It is seen that by this operation the conveyance force ratio in the deficiency portion of the conveyance zone is raised to greater than the design value successively over an increasing length of the conveyance zone. As the depressuring occurs a conveyance force ratio equal to the design conveyance force is established throughout the length of the conveyance zone and solids movement begins.

Referring now more particularly to Figure 2, the modification of the present invention in which conveyance fluid is introduced along the length of the conveyance conduit is shown. Around a conveyance conduit 40 of circular cross section is provided a plurality of toroidal headers 70, 72 and 74 each of which is provided with a conveyance fluid inlet, lines 76, 78 and 80, respectively. From the toroidal header a plurality of fluid inlet lines 82 are provided whereby conveyance fluid introduced into the headers is uniformly introduced into the conveyance zone. Preferably the conveyance fluid introduced via lines 76, 78 and 80 is drawn from the same conveyance fluid source that supplies fluid via line 32 into induction zone 30. This auxiliary conveyance fluid introduced is employed only during the start-up of the solids conveyance operation and is discontinued once the granular solids are in motion since the conveyance fluid entering with the solids in the void spaces makes the introduction of auxiliary fluid unnecessary.

Figure 6:
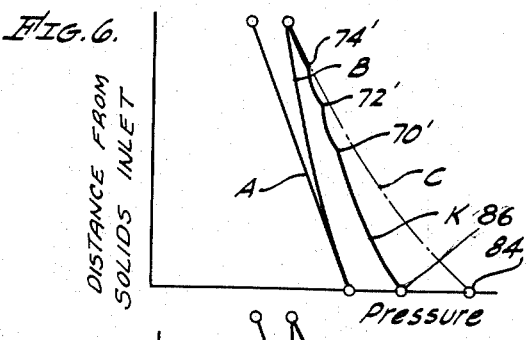
Figure 7:
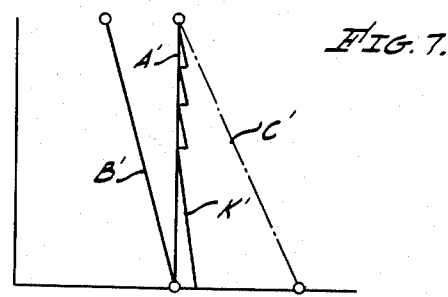

The effect of auxiliary conveyance fluid introduction upon the pressure and the conveyance force ratio existing along the length of the conveyance zone is shown in Figures 6 and 7, respectively.

Referring now more particularly to Figure 6 curve A shows the design operating pressure gradient along the conveyance zone during operation. During start-up when the design inlet pressure is established the outlet pressure is depicted by curve B. It is noted that at the bottom of the line both curves A and B coincide to the same pressure and have there the same slope. The slope of curve B at the top of the line is such that the pressure gradient is too low in the deficiency portion to convey the solids. In Figure 7 curve A′ indicates a constant value of $$\left(\frac{dp}{dl}\right)$$

across the length of the conveyance zone, whereas B′ corresponding with curve B in Figure 6 indicates that the conveyance force decreases with increase in the distance from the granular solids inlet. In order to establish a sufficient conveyance force ratio in the deficiency portion ending at the discharge of the line to move the solids, an inlet pressure indicated by point 84 would be required and that the pressure variation in the conveyance zone would then be shown by curve C in Figure 6. Curve C' in Figure 7 indicates that under such conditions a uselessly excessive conveyance force ratio exists near the inlet of the line in order to establish the minimum required force ratio through the deficiency portion.

By employing the supplementary addition of conveyance fluid as described in Figure 2 by means of headers 70, 72 and 74 the pressure variation in the conveyance zone thus established is shown by curve K in which the points of fluid addition are indicated by points 70', 72' and 74'. In this way a decreased conveyance fluid inlet pressure is permitted as indicated by point 86 during the start-up period. That this pressure suffices to eliminate the deficiency portion and to establish the conveyance force required throughout the line is indicated by curve K' in Figure 7. Thus with only a moderately increased conveyance fluid pressure at the solids inlet, a conveyance force ratio equal to the design operating value may be established throughout the length of the line in order to initiate granular solids flow.

Referring now more particularly ot Figure 3, supplementary apparatus is shown in conjunction with the conveyance apparatus of the present invention which permits initiating granular solids movement by either increasing the conveyance fluid inlet pressure a sufficient amount so the conveyance fluid flow under such conditions is sufficiently great without solids movement to establish a conveyance force ratio throughout the line greater than 1.0 or by reducing the outlet pressure with respect to the design inlet pressure. This increases the pressure drop across the line during the start-up period.

In either modification conveyance fluid is introduced via line 32 at a rate controlled by valve 34 after being pressured by means of pump or compressor 88. The pressured fluid then flows as described through line 32 into induction zone 30. During the start up this pressured conveyance fluid is subsequently passed into supplementary pump or compressor 90 by means of line 92 controlled by valve 94. With bypassing valve 96 closed supplementary pressuring means 90 raises the inlet conveyance fluid pressure to a value sufficiently greater than the design inlet valve so that an amount of conveyance fluid flows which is greater by the amount of fluid entering in the voids during operation, thus raising the force ratio in the deficiency portion to over 1.0. In other words, the inlet pressure is increased sufficiently to make the second portion of conveyance fluid referred to above rise during start-up to a value equal to the sum of the first and second portions existing during normal operations. Granular solids flow is initiated then in spite of the lack of conveyance fluid entering in the voids of the granular solids. Pressurized fluid from pressuring means 90 then passes via line 98 controlled by valve 100 into line 32 by means of which it passes into induction zone 30. Under these increased conveyance fluid pressure conditions granular solids flow is initiated. At this time the voids fluid is introduced with the solids and auxiliary pressuring means 90 is taken out of the circuit. Solids conveyance is then sustained by means of pressuring means 88 at the design inlet pressure.

Figure 8:
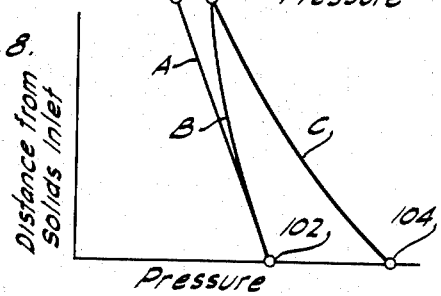
Figure 9:
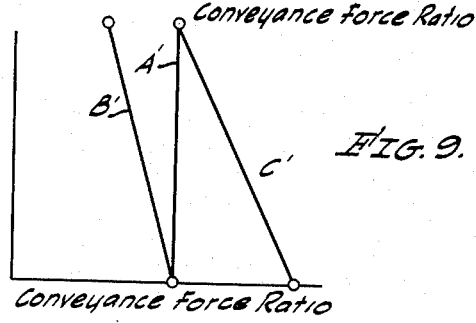

Referring to Figures 8 and 9, the variation in conveyance fluid pressure and conveyance force ratio throughout the length of the conveyance zone during the increased inlet pressure start-up procedure, just described, is shown. In Figures 8 and 9 curves A and A' respectively indicate the design variation in pressure and conveyance force ratio throughout the line. Curve B and B' respectively indicate the variation in the same conditions when the design inlet pressure is established, but in the absence of solids flow. By means of auxiliary compressor 90 the conveyance fluid inlet pressure is increased from the design value indicated by point 102 to an increased value indicated by point 104 thus establishing a pressure gradient indicated by curve C in Figure 8. The variation in conveyance force ratio established by this increased conveyance fluid pressure is indicated in Figure 9 by curve C' and it is noted that a sufficiently increased value is established throughout the length of the line necessary to initiate solids flow.

Figure 10:
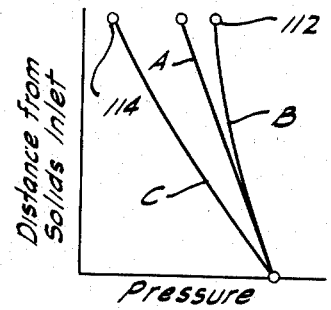
Figure 11:
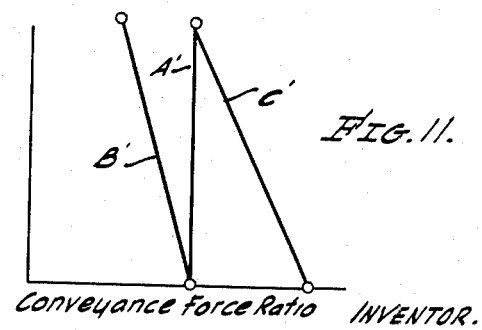

The same effect as just described may be attained by depressuring the outlet of the conveyance line to a value below the design outlet pressure whereby the conveyance fluid velocity in the deficiency portion of the conveyance zone is increased to establish a conveyance force ratio above 1.0 to initiate solids flow. In this modification evacuating means 106, which may be a vacuum pump for either fluids or liquids, withdraws conveyance fluid from line 56 via line 108 at a rate controlled by valve 110. The pressure existing in separator zone 44 decreases which increases the conveyance force ratio in the conveyance conduit as indicated in Figures 10 and 11 wherein curves A and A' indicate the design variation in pressure and conveyance force ratio respectively and curves B and B' indicate the variation in the same variables in the absence of the granular solids flow. In curve 10 the outlet pressure is shown decreased from the value indicated by point 112 to the start-up value indicated by point 114. Curve C therefore indicates the variation in conveyance fluid pressure in the line prior to solids flow. In Figure 11 curve C' indicates the conveyance force ratio in the line corresponding to curve C. Since at all points the conveyance force ratio greater than the design value is established and granular solids movement begins.

In each of the four above-described start-up procedures a single result is obtained, namely that of supplementing an insufficient conveyance fluid flow in the deficiency portion of conveyance conduit approaching the discharge outlet so that the conveyance force ratio existing therein may be increased to a value sufficient to initiate movement of the solids. In the modification described in Figure 1 this is done by raising the pressure of conveyance fluid in the void spaces between the solids in the deficiency portion of the conduit where force ratio increases are required. By subsequently depressuring this part of the conveyance zone expansion of the fluid contained in the voids supplements the second part of the conveyance fluid flow introduced into the inlet of the line at the design inlet pressure and considered to pass through the conduit. This modification is a preferred one in that it is unnecessary to exceed the design conveyance fluid pressure during start-up operations nor is it necessary to provide means for reducing the outlet pressure below the design value.

In the modification described in Figure 2 the deficiency in conveyance fluid is made up by direct introduction of conveyance fluid into the line through the deficiency portions of the conduit. This modification is also a preferred modification for the same reasons as given in connection with the modification of Figure 1.

The modifications described in connection with Figure 3 are also preferred modifications of the present procedure because the upper portion of the conveyance conduit need not be designed to withstand the same pressures of operation that the lower or inlet portion of the conduit is designed to withstand.

The foregoing start-up procedures are required when the conveyance fluid comprises a gas or vapor and in which a conveyance conduit of increasing cross sectional area in the direction of solids flow is employed. This is required since where the pressure drop of conveyance gas flow is more than about 5% of the absolute pressure of operation a substantial increase in the specific volume of the conveyance fluid results. Under conditions of operation in which the conveyance gas pressure differential across the conveyance zone is less than about 5% of the absolute value or where the conveyance fluid is a liquid which has a negligible increase in specific volume with depressuring the start-up procedures are not necessary.

The following examples illustrate the procedures of this invention as applied to initiating granular solids flow in a specific conduit.

*Example I*

Bead cracking catalyst of 4–10 mash is circulated at a rate of 500 tons per hour a distance of 226.9 feet between a reactor and a catalyst regenerator by means of 64,000 S. C. F. H. (standard cubic feet per hour) of compressed air as the conveyance fluid during normal operation. The variation of conduit diameter and conveyance fluid pressure with distance from the solids inlet is:

| Distance from Solids Inlet, Feet | Conduit Diameter, Inches | Conveyance Fluid Pressure, p. s. i. ab. |
|---|---|---|
| 0 | 14.7 | 95.3 |
| 20 | 15.88 | 88.2 |
| 40 | 17.06 | 81.1 |
| 60 | 18.28 | 74.1 |
| 80 | 19.55 | 67.0 |
| 100 | 20.90 | 59.9 |
| 120 | 22.36 | 52.8 |
| 140 | 24.0 | 45.7 |
| 160 | 25.8 | 58.7 |
| 180 | 28.0 | 31.6 |
| 200 | 30.7 | 24.5 |
| 226.9 | 35.9 | 15.0 |

During operation 39,800 S. C. F. H. of the conveyance fluid enters in the void spaces of the granular mass while the remaining 24,200 S. C. F. H. is pressured into the inlet of the conduit. In the absence of solids motion only 24,200 S. C. F. H. of air may be injected at the design inlet pressure of 95.3 p. s. i. ab. while 64,000 S. C. F. H. are required to maintain solids motion.

*Example II*

In the conduit of Example I the start-up procedure of Figure 1 is employed by initiating conveyance fluid flow into the solids inlet at the design pressure of 95.3 p. s. i. ab., throttling the conveyance fluid outlet from the separator chamber at the solids delivery point to cause the conveyance fluid pressure to rise there to a value of about 75.0 p. s. i. ab. and then simultaneously opening the solids outlet line and the conveyance fluid outlet from the separator chamber to depressure the regions of the conduit approaching the solids outlet to the normal or operating values in a time interval of about 20 seconds.

*Example III*

In the conduit of Example I the start-up procedure of Figure 2 is employed by introducing a total of 58,010 S. C. F. H. of conveyance fluid at three points; namely the solids inlet and two points 60 feet and 140 feet therefrom at respective rates of 36,800 S. C. F. H., 11,430 S. C. F. H. and 9,780 S. C. F. H. and at pressures of 119.6 p. s. i. ab., 90.4 p. s. i. ab., and 52.2 p. s. i. ab. The conveyance force ratio under such conditions exceeds 1.0 at all points and solids flow results. This procedure requires an inlet pressure of 119.6 p. s. i. ab. compared to 95.3 p. s. i. ab. for normal operation.

*Example IV*

In the conduit of Example I, one start-up procedure of Figure 3 is employed by raising the conveyance fluid pressure at the solids inlet to a value of 160.1 p. s. i. ab. to sufficiently raise the conveyance force ratio at all points to a value exceeding 1.0. This inlet pressure causes 58,000 S. C. F. H. of air to flow into the conduit, nearly 80% above the normal operating inlet pressure.

*Example V*

In the conduit of Example I the other procedure of Figure 3 is employed by lowering the pressure at the solids outlet. With a design inlet pressure of 95.3 p. s. i. ab. established and a conveyance fluid flow of 24,200 S. C. F. H. entering the conduit, the conveyance force ratio resulting is 1.1 at the solids inlet approximately 0.3 at the solids outlet. By reducing the outlet pressure to about 5 p. s. i. ab. by means of a steam ejector or other evacuating means, the conveyance force ratio is increased along the entire conduit to approximately 1.2, sufficient to initiate solids flow. At this time evacuation of the line may be discontinued as 39,800 S. C. F. H. further conveyance fluid enters in the voids of the solids and the outlet pressure returns to 15.0 p. s. i. ab.

Thus Example I illustrates the normal operation of a specific conveyance apparatus and Examples II through V illustrate the four specific start-up procedures employing the principle of this invention; namely, that of supplementing the conveyance fluid flow through the deficiency portion of the conveyance zone and thus raising the conveyance force ratio therein to a value which exceeds 1.0 in the conduit sufficient to initiate solids movement.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but is also applicable though part of the conveyance path is along a direction outside this solid angle.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a process for the conveyance of granular solids which comprises depressuring a conveyance fluid concurrently with a moving mass of granular solids through a conveyance zone while maintaining said solids during conveyance in substantially compact form as a solids mass having a bulk density substantially equal to the static bulk density of said solids when at rest, the improved process of initiating the movement of a stationary mass of solids contained in said conveyance zone which comprises the steps of initiating flow of said conveyance fluid through said conveyance zone containing at least a substantial amount of said solids at a rate sufficient to establish a conveyance force ratio at the inlet of said conveyance zone which exceeds 1.0 and which decreases in the direction of potential solids flow, temporarily supplementing the flow of conveyance fluid through portions of said conveyance zone having a conveyance force ratio less than 1.0, and discontinuing the supplementary treatment when motion of granular solids through said conveyance zone begins.

2. In a process for the conveyance of substantially compact granular solids as a solids mass having a bulk density substantially equal to the static bulk density of said solids when at rest by means of a concurrently depressuring conveyance fluid, the improved method for initiating motion of a stationary mass of such solids in said conveyance zone containing at least a substantial amount of said solids which comprises the steps of passing a flow of conveyance fluid through said conveyance zone at a rate sufficient to establish a conveyance force ratio at the solids inlet thereto which exceeds 1.0 and which decreases in the direction of potential solids flow through a deficiency portion of said conveyance zone in which a conveyance force ratio less than 1.0 exists, temporarily supplementing the flow of said conveyance fluid through said deficiency portion sufficiently to establish a conveyance force ratio exceeding 1.0, then terminating the step of supplementing said conveyance fluid flow when motion of granular solids through said conveyance zone begins, and subsequently maintaining normal operating conditions.

3. An improved process according to claim 2 wherein said conveyance fluid flow through said deficiency portion of said conveyance zone is supplemented by the steps of first temporarily throttling the conveyance fluid flow from said conveyance zone to raise the conveyance fluid pressure therein to a point above the normal operating pressure, and subsequently depressuring the conveyance zone to the normal operating value.

4. An improved process according to claim 2 wherein said conveyance fluid flow through said deficiency portion of said conveyance zone is supplemented by the step of direct injection of supplementary conveyance fluid temporarily into said deficiency portion of said conveyance zone, and subsequently terminating such fluid injection when granular solids motion begins.

5. An improved process according to claim 4 wherein said supplementary conveyance fluid is injected at a plurality of points throughout said deficiency portion.

6. An improved process according to claim 2 wherein said conveyance fluid flow through said deficiency portion of said conveyance zone is supplemented by the step of temporarily increasing the pressure of the conveyance fluid injected into said conveyance zone to a value above the normal operating value thereby increasing the conveyance fluid flow sufficiently throughout said deficiency portion to establish a conveyance force ratio greater than 1.0, and subsequently reducing the inlet pressure to the normal operating value when motion of granular solids begins.

7. An improved process according to claim 6 wherein the increase in pressure of the conveyance fluid inlet is sufficient to cause the conveyance fluid to flow into the inlet of said conveyance zone in the absence of solids flow at a rate which is substantially equal to the total rate of conveyance fluid flow during normal operation.

8. An improved process according to claim 2 wherein said conveyance fluid flow through said deficiency portion of said conveyance zone is supplemented by the step of maintaining the conveyance fluid pressure at the discharge outlet of said conveyance zone temporarily at a value below the normal operating value sufficient to establish a conveyance force ratio greater than 1.0 throughout said deficiency portion, and subsequently re-establishing the normal operating discharge pressure when motion of granular solids begins.

9. A process for initiating flow of substantially compact solids as a solids mass having a bulk density substantially equal to the static bulk density of said solids when at rest through a conveyance zone containing at least a substantial amount of said solids which comprises the steps of passing a conveyance fluid through said conveyance zone at a rate sufficient to establish a conveyance force ratio at the solids inlet thereto which exceeds 1.0 and which decreases in the direction of potential solids flow through a deficiency portion of said conveyance zone in which a conveyance force ratio less than 1.0 exists, first temporarily throttling the conveyance fluid flow from the outlet of said conveyance zone to increase the conveyance fluid pressure to a value above the normal operating value at the solids outlet and within said deficiency portion, and subsequently depressuring said conveyance zone to the normal operating value to supplement the conveyance fluid flow in said deficiency portion and establish a conveyance force ratio throughout said conveyance zone which exceeds 1.0.

10. An improved process according to claim 9 wherein the conveyance fluid pressure at the solids outlet of said conveyance zone is increased to a value between the normal operating values of the solids inlet and solids outlet pressures of said conveyance zone.

11. A process for initiating the flow of substantially compact solids as a solids mass having a bulk density substantially equal to the static bulk density of said solids when at rest in a conveyance zone containing at least a substantial amount of said solids which comprises the steps of passing a conveyance fluid through said conveyance zone at a rate sufficient to establish a conveyance force ratio at the solids inlet thereto which exceeds 1.0 and which decreases in the direction of potential solids flow through a deficiency portion of said conveyance zone in which the conveyance force ratio less than 1.0 exists, directly injecting at least one flow of supplementary conveyance fluid temporarily into said deficiency portion of said conveyance zone to increase the conveyance force ratio therein to a value therein exceeding 1.0, and terminating the supplementary injection of conveyance fluid once the normal granular solids flow rate is established.

12. A process for initiating the flow of substantially compact solids as a solids mass having a bulk density substantially equal to the static bulk density of said solids when at rest in a conveyance zone containing at least a substantial amount of said solids which comprises the steps of passing a conveyance fluid through said conveyance zone at a rate sufficient to establish a conveyance force ratio at the solids inlet thereto which exceeds 1.0 and which decreases in the direction of potential solids flow through a deficiency portion of said conveyance zone in which a conveyance force ratio less than 1.0 exists, temporarily increasing the conveyance fluid pressure at the granular solids inlet of said conveyance zone to a value exceeding the normal operating value thereby effecting a conveyance fluid flow rate in the absence of granular solids flow which is equal to the normal conveyance fluid flow rate during solids flow thereby establishing a conveyance force ratio greater than 1.0 throughout said conveyance zone, and subsequently reducing the conveyance fluid inlet pressure to the normal operating value upon establishment of the normal solids flow rate.

13. A process for initiating the flow of a substantially compact mass of granular solids having a bulk density substantially equal to the static bulk density of said solids when at rest in a conveyance zone containing at least a substantial amount of said solids which comprises the steps of passing a conveyance fluid through said conveyance zone at a rate sufficient to establish a conveyance force ratio at the solids inlet thereto which exceeds 1.0 and which decreases in the direction of potential solids flow through a deficiency portion of said conveyance zone in which a conveyance force ratio less than 1.0 exists, temporarily reducing the conveyance fluid pressure at the solids discharge of said conveyance zone from the normal operating pressure sufficient to cause the discharge of conveyance fluid to increase to substantially the normal operating velocity and to establish a conveyance force ratio greater than 1.0 throughout said conveyance zone and then reestablishing the normal operating outlet presure upon the establishment of the normal solids flow rate.

14. An apparatus for the conveyance of granular solids which comprises a conduit provided with a granular solids inlet, an inlet for conveyance fluid under pressure, a granular solids outlet, and an outlet for depressured conveyance fluid, means for maintaining granular solids within said conduit in substantially compact form as a solids mass having a bulk density substantially equal to the static bulk density of said solids when at rest, and means for temporarily supplementing the flow of conveyance fluid through at least part of said conduit containing at least a substantial amount of said solids only until movement of the stationary mass of substantially compact solids therein is initiated.

15. An apparatus for the conveyance of granular solids which comprises a conduit provided with a granular solids inlet, an inlet for conveyance fluid under pressure, a granular solids outlet, and an outlet for depressured conveyance fluid, means for maintaining said solids in said conduit as a solids mass having a bulk density substantially equal to the static bulk density of said solids when at rest, and means in said depressured conveyance fluid outlet for first temporarily throttling the flow of fluid therethrough to increase the pressure of conveyance fluid in said conveyance zone and then depressuring said conduit through said conveyance fluid outlet at a rate sufficient to establish a conveyance force ratio greater than 1.0 in said conduit containing at least a substantial amount of said solids.

16. An apparatus for the conveyance of granular solids which comprises a conduit provided with a granular solids inlet, an inlet for conveyance fluid under pressure, a granular solids outlet, and an outlet for depressured conveyance fluid, means for maintaining granular solids in said conduit as a solids mass having a bulk density substantially equal to the static bulk density of said solids when at rest, at least one inlet for supplementary conveyance fluid along the length of said conduit containing at least a substantial amount of said solids, means for terminating the injection of said conveyance fluid when the normal granular solids flow rate through said conduit is established, and means for maintaining a pressure at said inlet above that in said conduit until solids motion begins.

17. An apparatus for the conveyance of granular solids which comprises a conduit provided with a granular solids inlet, an inlet for conveyance fluid under pressure, a granular solids outlet, and an outlet for depressured conveyance fluid, means for maintaining the moving granular solids as a solids mass having a bulk density substantially equal to the static bulk density of said solids when at rest, means for temporarily pressuring the conveyance fluid into said conduit containing at least a substantial amount of said solids at a pressure exceeding the normal fluid inlet pressure only until the normal granular solids flow rate is established, and means for maintaining thereafter said normal fluid inlet pressure.

18. An apparatus for the conveyance of granular solids which comprises a conduit provided with a granular solids inlet, an inlet for conveyance fluid under pressure, a granular solids outlet, and an outlet for depressured conveyance fluid, means at said granular solids outlet for maintaining the flowing solids in said conduit as a solids mass having a bulk density substantially equal to the static bulk density of said solids when at rest, means for temporarily reducing the conveyance fluid pressure at said conveyance fluid outlet to a value below the normal conveyance fluid outlet pressure only until the normal granular solids flow rate through said conduit containing at least a substantial amount of said solids is established, and means for then maintaining said conveyance fluid outlet pressure at a predetermined normal operating pressure.

19. An apparatus according to claim 15 in combination with a valve actuating instrument adapted to first throttle a valve in said outlet for depressured conveyance fluid, then open said valve at a predetermined rate to depressure and supplement conveyance fluid flow within said conveyance conduit, and then open a valve in said granular solids outlet.

References Cited in the file of this patent

UNITED STATES PATENTS

| | | |
|---|---|---|
| 1,390,974 | Von Porat | Sept. 13, 1921 |
| 1,465,269 | Horn et al. | Aug. 21, 1923 |
| 1,991,403 | McManamna | Feb. 19, 1935 |
| 2,304,827 | Jewell | Dec. 15, 1942 |
| 2,463,623 | Huff | Mar. 8, 1949 |
| 2,487,961 | Angell | Nov. 15, 1949 |
| 2,541,077 | Leffer | Feb. 13, 1951 |

FOREIGN PATENTS

| | | |
|---|---|---|
| 10,635 | Germany | Aug. 21, 1880 |
| 180,397 | Great Britain | May 11, 1922 |
| 268,667 | Great Britain | Apr. 7, 1927 |